July 9, 1968   F. B. MERCER   3,392,080
COMPRESSED FOAMED POLYSTYRENE NET AND METHOD OF MAKING THE SAME
Filed Dec. 9, 1964

INVENTOR
FRANK BRIAN MERCER

BY
ATTORNEY

United States Patent Office 3,392,080
Patented July 9, 1968

3,392,080
COMPRESSED FOAMED POLYSTYRENE NET AND METHOD OF MAKING THE SAME
Frank Brian Mercer, Blackburn, England, assignor to Plastic Textile Accessories Limited, Blackburn, England, a British company
Filed Dec. 9, 1964, Ser. No. 417,005
Claims priority, application Great Britain, Dec. 18, 1963, 49,934/63
2 Claims. (Cl. 161—109)

ABSTRACT OF THE DISCLOSURE

The flexibility of extruded foamed polystyrene net is enhanced by compressing the foamed net structure while still soft and pliable, i.e., before the cells of the foamed structure take up air from the atmosphere, along spaced parallel lines transverse to the direction of extrusion, whereby the cells along the compression lines are collapsed and thus inhibited from taking up air and losing flexibility.

---

This invention relates to a lightweight resilient sheet material comprising integral (i.e., knotless) plastic net made of foamed (i.e., expanded) plastic, e.g., polystyrene.

After the net has been formed, e.g., by extrusion, the plastic has to be heat treated, for example, by steaming, to expand the material of the net to the required density. Directly after this treatment and for some time afterwards, the net is extremely soft and flexible, but after that the cells in the plastic pick up air from the atmosphere and the net acquires a rubbery texture giving desirable cushioning properties for packaging and the like; the net also has, however, particularly when the net is flexed transversely to the direction of extrusion, a tendency to crack. This is because the cells on the surface of each strand have expanded and form a complete and tight skinned sheath around each strand core, which, when once broken, allows stresses to be transmitted to the residual core which then breaks.

It is an object of the present invention to provide an extruded foamed plastic net which has increased flexibility, particularly in the direction transverse to its extrusion, making it more suitable for general wrapping or packaging.

The invention consists a lightweight resilient sheet material made by compressing extruded foamed plastic net, while still soft and flexible, i.e., shortly after or during the expanding or foaming treatment, along spaced parallel lines extending transverse to the direction of extrusion. The width and spacing of such lines will depend on the flexibility required and the gauge and mesh of the net, but a convenient width and spacing is, say, one sixteenth to one eighth of an inch and one quarter to one half an inch respectively.

The compressed portions will take up a minimum of air as the freshly made net matures and so these portions retain relative flexibility.

The net may also be locally compressed along spaced parallel lines extending in the direction of extrusion, i.e., at right angles to the transverse compression lines, so that the two sets of compression lines form a square lattice.

According to one convenient mode of producing the compression lines, the net is passed after its steaming treatment to the nip of a pair of rolls at least one of which is axially fluted, the flutes corresponding in width and circumferential spacing to the width and spacing of the compression lines. When only one roller is fluted, the net is compressed from one side only, but where a pair of co-operating fluted rollers are used the net will be compressed from both sides and the compressed portions will lie generally in the median plane of the net. Where the net is to be compressed also along lines extending in the direction of extrusion, the roll or both rolls are provided with additional circumferentially extending flutes.

Figure 1:
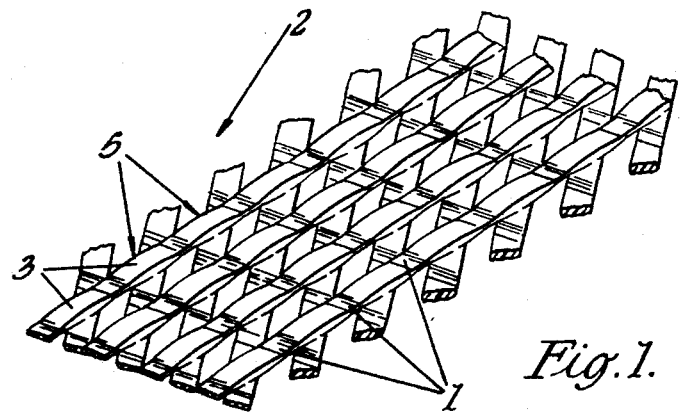
Figure 2:
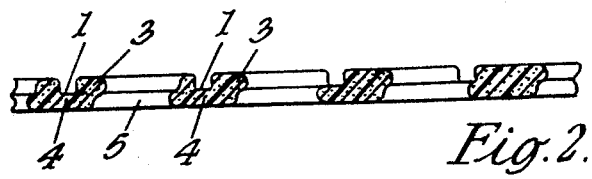
Figure 3:
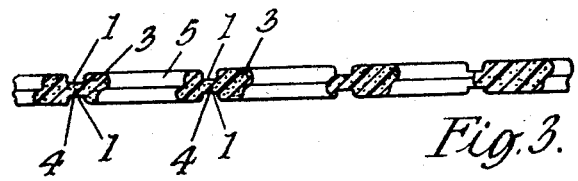
Figure 4:
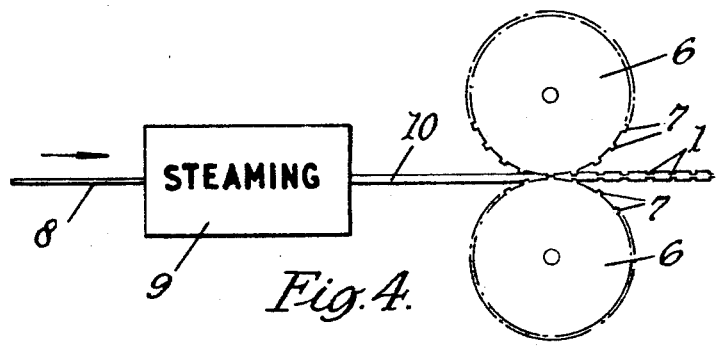

In the accompanying drawings:
FIGURE 1 is a perspective view of expanded plastic net provided with spaced compression lines extending transversely to the direction of extrusion, according to the present invention.
FIGURES 2 and 3 are longitudinal (extrusion direction) sections of expanded plastic having compression lines formed, respectively, from one and from both sides of the net, and
FIGURE 4 is a diagram of suitable apparatus for forming the transverse compression lines.

In carrying the invention into effect according to one mode by way of example, integral (i.e., knotless) plastic net made of foamed (i.e., expanded) plastic is provided, after final expansion, with compression lines 1 extending transversely of the direction of extrusion indicated by the arrow 2. The spacing between the compression lines may be substantially equal to the distance between the mesh intersections 3, as illustrated, but this need not be the case and the compression line spacing may be selected according to the flexibility required and the gauge and mesh of the net or the characteristic of the plastic itself; the same applies to the width of each compression line.

Compression lines 1 may be formed from one side of the net, as shown in FIGURE 2, or from both sides as shown in FIGURE 3.

The effect of the compression lines 1 is that the plastic material 4 along each line is compressed and the cellular structure crushed and collapsed. In the intervening portions 5 of the net the cells subsequently take up air from the atmosphere, whereby the net in general acquires a rubbery, resilient texture to give the desired cushioning properties for packaging and the like, but with the result that the intervening portions 5 would tend to crack and then break were it not for the compression lines 1 providing flexure lines due to the fact that the cells along the compression lines, being collapsed, do not take up air and therefore retain flexibility.

This effect is most unexpected and most marked and renders an otherwise brittle and relatively inflexible product highly suitable for packaging and wrapping.

While generally it will only be necessary, due to the structure of an elongated diamond mesh net (as shown in FIGURE 1), to form the compression lines substantially at right angles (or crosswise) of the direction of the long diagonals of the diamond meshes, nets of such mesh or other mesh forms, e.g., square mesh net, may be provided with compression lines running in two directions at right angles (not illustrated), e.g., along direction of extrusion and transverse thereto or parallel to the two sets of strands of square mesh net or the diagonals.

The compression lines may be formed by any suitable means but conveniently a fluted roller or rollers 6 (see FIGURE 4) may be used, the spacing between flutes 7 and the circumferential width of the flutes 7 dictating, respectively, the spacing between, and the width of, the compression lines 1.

The compression of the plastic net along the lines 1 takes place during or immediately after the plastic material has attained its final expansion. This will depend on the plastic itself and/or its blowing agent. An extruded polystyrene net, for example, is passed into a hot water bath and experiences first stage expansion; the net may then be allowed to mature or age for a period, say 12 hours. The net is then subjected to final stage expansion or post-expansion by steaming, thus, as shown diagrammatically in FIGURE 4 the first stage expanded net 8 is passed into a steaming chamber 9 (where it is held flat between endless steel mesh belts in known manner—not shown); the post-expanded net 10 is then passed between the nip of the pair of fluted rollers 6, the flutes 7 of which form the compression lines 1 of the finished product.

I claim:

1. A flexible lightweight resilient sheet material comprising an extruded net of foamed polystyrene having spaced, narrow, parallel zones extending transverse to the direction of stretch, in which the polystyrene is compressed and the cells therein crushed and containing the minimum of air, the intervening net portions having expanded air cells.

2. A method of producing a flexible lightweight resilient plastic sheet material comprising compressing extruded foamed polystyrene net, while still soft and flexible, along spaced parallel lines extending transverse to the direction of extrusion to inhibit the subsequent take-up of air by the polystyrene contained in the compression lines.

References Cited

UNITED STATES PATENTS

| | | |
|---|---|---|
| 2,434,532 | 1/1948 | Wurzburger. |
| 2,537,323 | 1/1951 | Wurzburger _____ 161—57 |
| 3,051,987 | 9/1962 | Mercer. |
| 3,106,983 | 10/1963 | Karpovich et al. |
| 3,227,184 | 1/1966 | Anderson et al. __ 161—109 X |
| 3,328,505 | 6/1967 | Spencer _____ 161—117 X |

ROBERT F. BURNETT, *Primary Examiner.*

R. H. CRISS, *Examiner.*